United States Patent
Giblin et al.

(10) Patent No.: US 9,009,842 B2
(45) Date of Patent: *Apr. 14, 2015

(54) USING DATA ANALYTICS AND CROWDSOURCING TO DETERMINE ROLES FOR A COMPUTER SYSTEM

(71) Applicant: International Business Machines Corporation, Armonk, NY (US)

(72) Inventors: Christopher J. Giblin, Zurich (CH); Milton H. Hernandez, Tenafly, NJ (US); Sriram K. Rajagopal, Chennai (IN); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,384

(22) Filed: Jan. 28, 2013

(65) Prior Publication Data

US 2014/0165154 A1    Jun. 12, 2014

Related U.S. Application Data

(63) Continuation of application No. 13/711,079, filed on Dec. 11, 2012.

(51) Int. Cl.
*G06F 21/00* (2013.01)
*G06F 21/45* (2013.01)
*H04L 29/06* (2006.01)
(Continued)

(52) U.S. Cl.
CPC ............... *G06F 21/45* (2013.01); *H04L 63/10* (2013.01); *H04L 63/20* (2013.01); *G06F 21/6209* (2013.01); *G06F 21/62* (2013.01); *G06F 21/604* (2013.01)

(58) Field of Classification Search
CPC ......... G06F 21/00; G06F 21/50; G06F 21/55; G06F 11/00; G06F 21/45; G06F 21/6209; G06F 21/62; G06Q 50/01
USPC ................................ 726/21, 26, 27, 28, 29, 1
See application file for complete search history.

(56) References Cited

U.S. PATENT DOCUMENTS

2007/0038610 A1    2/2007   Omoigui
2009/0106080 A1    4/2009   Carrier et al.
(Continued)

OTHER PUBLICATIONS

Kuhlmann et al., "Role mining—Revealing Business Roles for Security Administration Using Data Mining Technology," Proceedings of the Eighth ACM Symposium on Access Control Models and Technologies (SACMAT '03), Jun. 2003, pp. 179-186.
(Continued)

*Primary Examiner* — Kaveh Abrishamkar
*Assistant Examiner* — Ayoub Alata
(74) *Attorney, Agent, or Firm* — Yee & Associates, P.C.; Louis J. Percello (57) ABSTRACT

In an embodiment of the invention, wherein users must be able to access a computer system to perform respective functions, initial data is acquired from data sources, some of the initial data pertaining to previously granted system access rights. The initial data is used to create a crowdsourcing task, which is executed to acquire crowdsourced data from SMEs in an SME population, wherein the crowdsourced data comprises additional data pertaining to previously granted system access. The crowdsourced data is used to create a set of role definitions, wherein the role definitions determine which of the users are assigned to be members of a particular role associated with the system, and further determine the access rights that are granted to each member of the particular role.

16 Claims, 7 Drawing Sheets

(51) Int. Cl.
*G06F 21/62* (2013.01)
*G06F 21/60* (2013.01)

(56) References Cited

U.S. PATENT DOCUMENTS

| | | |
|---|---|---|
| 2010/0153094 A1 | 6/2010 | Lee et al. |
| 2012/0291102 A1 | 11/2012 | Cohen |
| 2013/0198861 A1 | 8/2013 | Kishi et al. |
| 2013/0246327 A1 | 9/2013 | Tabrizi |
| 2014/0165188 A1 | 6/2014 | Giblin et al. |

OTHER PUBLICATIONS

Vukovic et al., "Accelerating the Deployment of Security Service Infrastructure with Collective Intelligence and Analytics" Proceedings of the 2012 IEEE Ninth International Conference on Services Computing (SCC), Jun. 2012, pp. 625-632.

Giblin et al., "Towards an Integrated Approach to Role Engineering," Proceedings of the 3rd ACM Workshop on Assurable and Usable Security Configuration (SafeConfig '10), Oct. 2010, pp. 63-70.

Giblin et al., "Using Data Analytics and Crowdsourcing to Determine Roles for a Computer System", USPTO U.S. Appl. No. 13/711,079, filed Dec. 11, 2012, 30 pages.

Office Action, dated Jan. 13, 2014, regarding USPTO U.S. Appl. No. 13/711,079, 20 pages.

Notice of Allowance dated Jun. 9, 2014, regarding U.S. Appl. No. 13/711,079, 20 pages.

Office Action, dated Oct. 16, 2014, regarding U.S. Appl. No. 13/711,079, 9 pages.

Notice of Allowance dated Dec. 2, 2014, regarding U.S. Appl. No. 13/711,079, 16 pages.

USING DATA ANALYTICS AND CROWDSOURCING TO DETERMINE ROLES FOR A COMPUTER SYSTEM

This application is a continuation of and claims the benefit of priority to U.S. patent application Ser. No. 13/711,079, filed on Dec. 11, 2012 status pending entitled "USING DATA ANALYTICS AND CROWDSOURCING TO DETERMINE ROLES FOR A COMPUTER SYSTEM". The contents of which are hereby incorporated by reference.

BACKGROUND

1. Field

The invention disclosed and claimed herein generally pertains to discovering user access rights in a computer system environment such as a large service hosting environment. More particularly, the invention pertains to using discovered access rights, together with data analytics and crowdsourcing, to design or construct a set of role definitions for controlling user access to the system.

2. Description of the Related Art

In connection with data processing systems used in the past, small teams of administrators typically ran servers locally. As an example, 4 administrators could each be responsible for 100 servers. As a common practice to provide security, each administrator would be granted access privileges by giving them a user ID or password, for each server or system that she or he administered. Thus, for the above example a total of 4×100 administrator IDs, or four hundred IDs, would be needed.

More recently, data centers have been developed wherein 40 administrators, by way of example, could be responsible for 1000 servers. For this example, 40×1000 administrator IDs, or 40,000, would be needed for security. Moreover, a current development is the significant expansion of IT delivery centers. These activities are exemplified by 400 administrators each being responsible for 10,000 servers, thus requiring 400×10,000 or 4 million administrator IDs.

The above examples demonstrate the exponential increase in privileged user ID requirements, for access to currently used systems. However, in arrangements wherein an administrator has a privileged user ID on every system that she or he administers, there is an increased risk of user ID mismanagement. There also tends to be increased administration costs.

On the other hand, in systems wherein users share privileged IDs, there is a risk of losing accountability, and there are also issues with password management and security. Moreover, this arrangement tends to be out of step with present regulatory thinking.

SUMMARY

Embodiments of the invention enable an organization to readily and automatically transition from a secured access approach based on user IDs, to security management based on roles and permissions that make sense for that organization. One embodiment, in an environment wherein multiple users must each be able to access a particular computer system to perform respective functions, is directed to a method. The method includes the step of acquiring initial data from one or more data sources, wherein at least some of the initial data pertains to previously granted access rights for the particular system. The method further includes using the initial data to create a specified crowdsourcing task, and executing the specified crowdsourcing task to acquire crowdsourced data from subject matter experts (SMEs) in an SME population, wherein the crowdsourced data comprises additional data pertaining to previously granted access rights for the particular system. The method further includes using the crowdsourced data to create a set of role definitions, wherein the role definitions determine which of the users are assigned to be members of a particular role associated with the particular system, and further determine access rights for the particular system that are granted to each member of the particular role.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
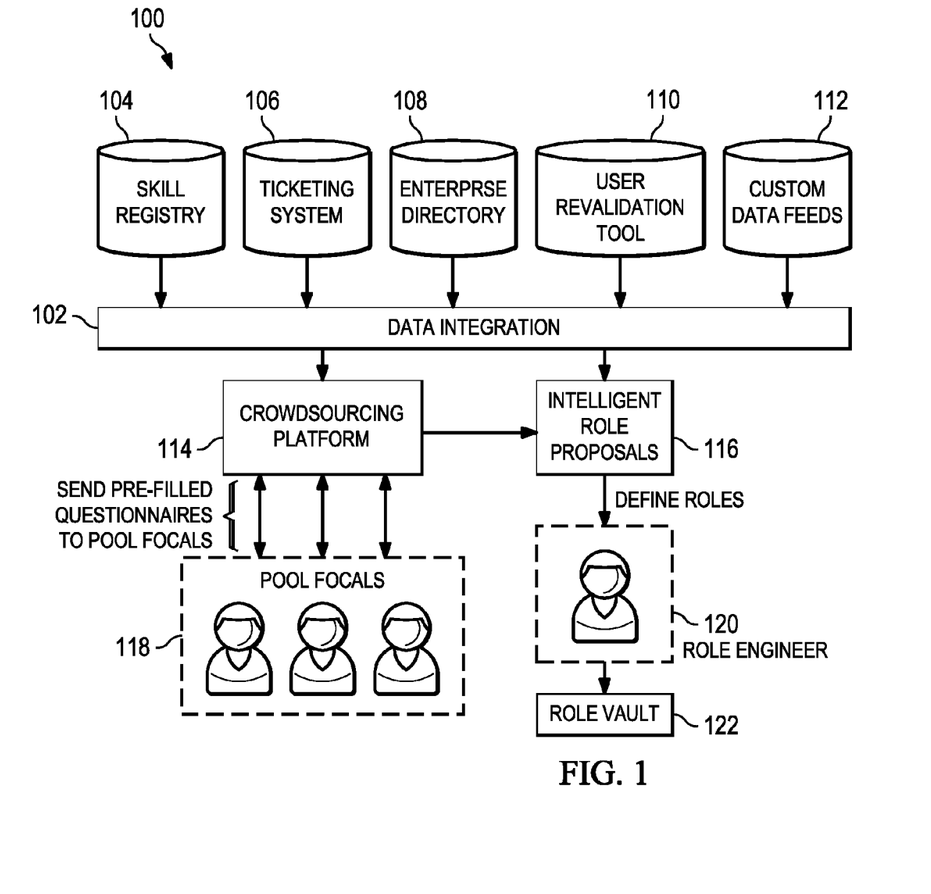
FIG. 1 is a schematic diagram showing components for an embodiment of the invention.

Referring to FIG. 1, there are shown respective components for a system 100, which is provided to implement an embodiment of the invention. In the embodiment of FIG. 1, there is an initial discovery of existing user access rights, such as rights provided by privileged user IDs as described above to access a particular computer system. System 100 then processes the discovered access rights, together with other pertinent data, using both data analytics and crowdsourcing. These actions define or produce a set of roles, which are used subsequently to control user access to the computer system.

In role-based access control, as used by a particular organization, roles are defined to enable various functions of the organization to be carried out. More particularly, all system access rights that are needed to carry out a given function are assigned to a role associated with the given function. These access rights are also referred to as "permissions". Each system user that must be able to perform the given function is also assigned to the associated role, and thus becomes authorized to use all system access rights, or permissions, which have been granted to that role. Permissions of a role may give users assigned to the role access to read a file or directory, access to write to a file or directory, or access to run a file program or the like.

From the above, it is seen that a role is a method for providing permissions or user ID entitlements to a group of users within an organization. Moreover, if a person is assigned to that role, all entitlements available to the role then become available to that person in the role. It will be appreciated that use of roles to manage computer system access, particularly in a large organization, can significantly simplify such management.

Referring further to FIG. 1, there is shown a data integration tool or component 102, which is configured to receive data from exemplary data sources 104-112. It will be appreciated that for an enterprise or other organization, the job, task or function of a person in the organization will determine the role or roles to which she or he is assigned, for purposes of computer system access. Accordingly, sources 104-112 are selected because they contain data useful for providing such information. Sources 104-112 usefully also include data pertaining to prior system access rights granted to persons in the organization.

By way of example and not limitation, data source 104 comprises a skill registry. That is, source 104 is a database containing descriptions of respective skills required for and possessed by certain persons in the organization. Users in the organization having skills pertaining to use of the computer system would clearly need to have corresponding permissions to access the system.

Data source 106 contains ticketing information, and thus may identify persons engaged in computer system maintenance tasks or the like. Data source 108 usefully comprises a directory for the enterprise or organization, and thus identifies the function of each person in the organization. Data source 110 is a Userid Revalidation Tool (URT). This is a tool that generally performs employment verifications and privilege revalidations, and assesses continued business needs. Data source 112 is directed to custom data feeds or other sources, such as server inventories.

By providing data sources 104-112, data integration tool 102 is able to mine these sources, to obtain data that is pertinent to discovering roles and permissions for the organization. For example the mined data could be selectively analyzed or consolidated by integration tool 102, and then mapped onto a normalized data model or data warehouse. The mined data could also be processed by integration tool 102, to identify pools, or groups of persons within the organization, wherein all persons in a pool require the same permissions or system access rights.

FIG. 1 shows data integration tool 102 configured to interact with crowdsourcing platform 114 and intelligent role proposals component 116. In addition to performing the analyzing and processing tasks described above, data integration tool 102 is operable to create assessments, or questionnaires. These questionnaires are designed to acquire further information in regard to pools as described above, and also to roles associated with such pools. Questionnaires are more specifically intended to be distributed to subject matter experts (SMEs) as a crowdsourcing task, to augment the mined data obtained from sources 104-112. The SMEs could be selected from the skill registry 104, for example, or could be manually assigned.

In an embodiment of the invention, the questionnaires could be prefilled or populated with data pertaining to the enterprise or organization. The questionnaires could also contain data pertaining to prior user passwords and IDs and the like. By way of example and not limitation, a questionnaire for an embodiment of the invention could have the following structure:

- meta data about pool operations (e.g. work activities provided, number and type of customers supported, contact person for reusable ID management)
- account list (e.g. password expiration intervals, access type, applications supported, number of IDs, and number of reusable IDs)
- account prerequisites (e.g. regulatory properties that must be met by system administrators working on respective accounts, such as citizenship, drug testing)
- team members and accounts (e.g. team members, their assignment to account and its servers)
- data about stepping stone servers (where applicable)
- team member details (e.g. email, location)

After a questionnaire has been created, crowdsourcing platform 114 distributes the questionnaire to SMEs. Usefully, these SMEs are the respective team leaders, or pool focals 118, of each distinct pool that has been identified within the organization, as described above. The pool focals can then be responsible for further distributing the questionnaire to appropriate persons in their respective pools, and ensuring that completed questionnaires are collected and returned to crowdsourcing platform 114.

Following return of the completed questionnaires, the intelligent role proposals component 116 interacts with data integration tool 102 and platform 114 of system 100 to consolidate and process data furnished by the questionnaires. The components of system 100 also function to resolve inconsistencies in role definitions for different groups. Examples of inconsistencies that are resolved include removal of duplicate IP addresses, and removing conflicts between two sets of roles with the same IP/Hostname. Further resolution examples include removing conflicts of the same endpoints and different service names; of the same endpoints and different host names (same IP); of the same endpoints and different IPs (but same host names); of the same endpoints, but different platforms; and of the same end points but different customers.

In addition, components of system 100 assist role engineer 120 in defining roles for the organization. Thus, system 100 in its operation is able to optimize a process for determining a set of roles for the organization. FIG. 1 shows further that after a set of roles has been defined, the set of roles is placed into a role vault 122. An onboarding process may then be used to inform members of an organization what their respective roles are, and the permissions granted by each role.

Figure 2:
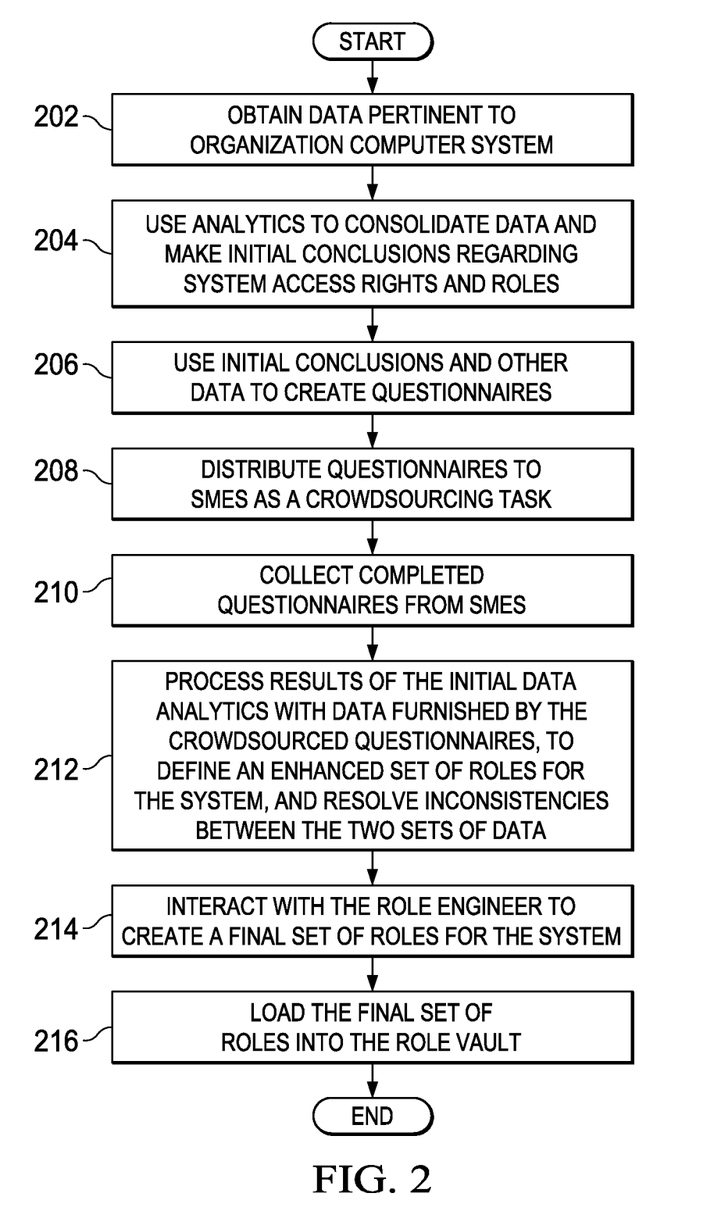
FIG. 2 is a flow chart showing steps for a method comprising an embodiment of the invention.

Referring to FIG. 2, there is shown a flow chart depicting steps for a method comprising an embodiment of the invention. At step 202, data is obtained that is pertinent to a computer system of an enterprise or other organization. Such data could be acquired by accessing data sources or repositories such as sources 104-112, as described above. However, embodiments of the invention are not limited to such sources.

At step 204, analytics are used with data obtained at step 202 to make initial conclusions regarding system access rights and associated roles. More particularly, analytics are used to discover elements and patterns pertaining to system access roles, as described above. Groups or pools of system users are thereby identified, wherein all users in a given pool need to have the same type of access rights to the system.

Initial conclusions of step 204 and other data, such as further information from sources 104-122, are used to create or construct a set of questionnaires, such as the questionnaire described above in connection with FIG. 1. This is carried out at step 206. The questionnaires are distributed to SMEs as a crowdsourcing task at step 208. Completed questionnaires are subsequently collected, at step 210.

At step 212, information pertaining to roles provided by the data analytics of step 204 is selectively processed with data furnished by the crowdsourced questionnaires. This produces or defines an enhanced set of roles for the system, wherein inconsistencies are resolved.

At step 214, the role engineer interacts with the enhanced set of roles of step 212, in order to create a final set of roles. The final set of roles is loaded into the role vault at step 216.

Figure 3A:
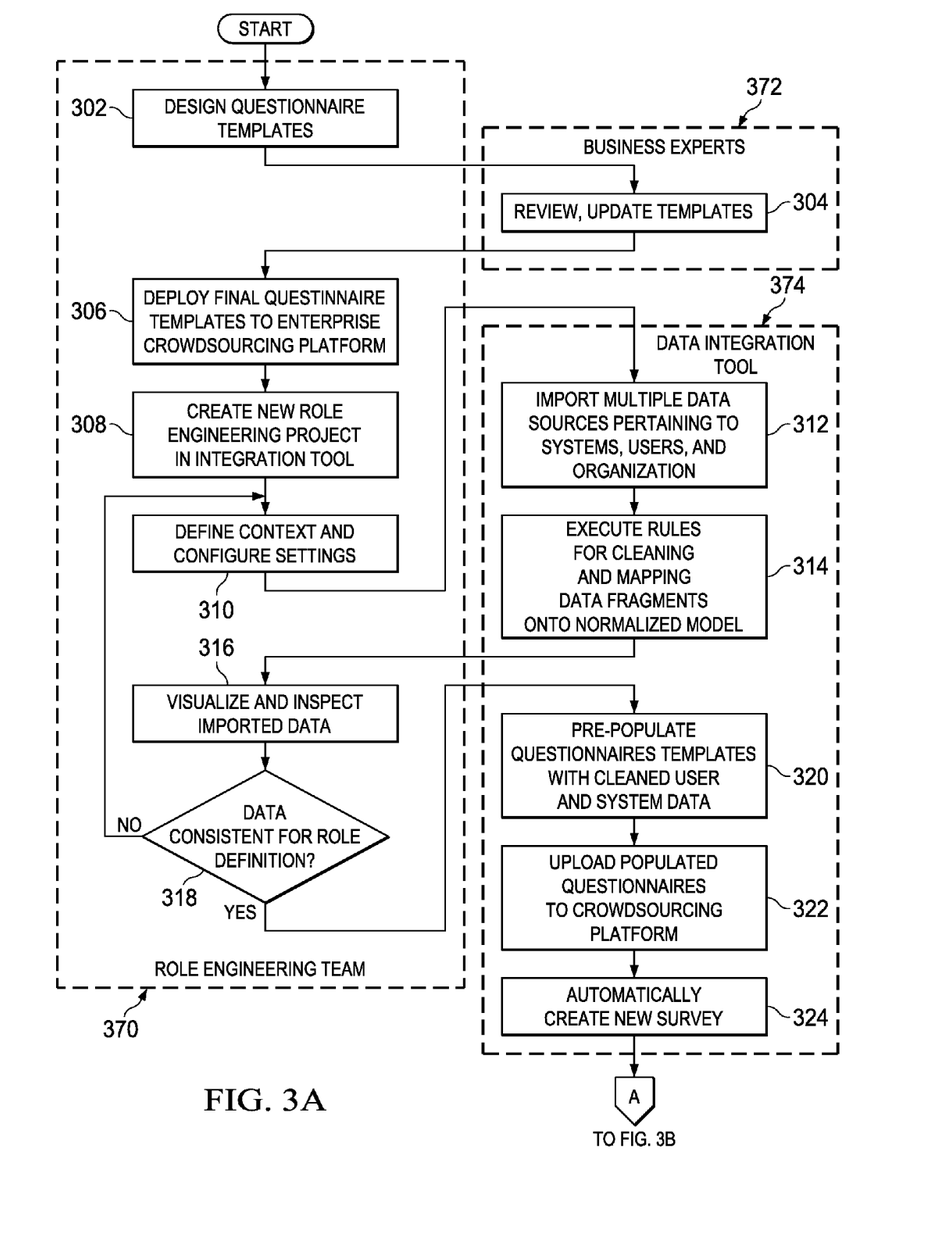
FIGS. 3A, 3B and 3C, collectively are a flow chart showing steps of a further embodiment of the invention, which may be implemented using components of FIG. 1.
Figure 3B:
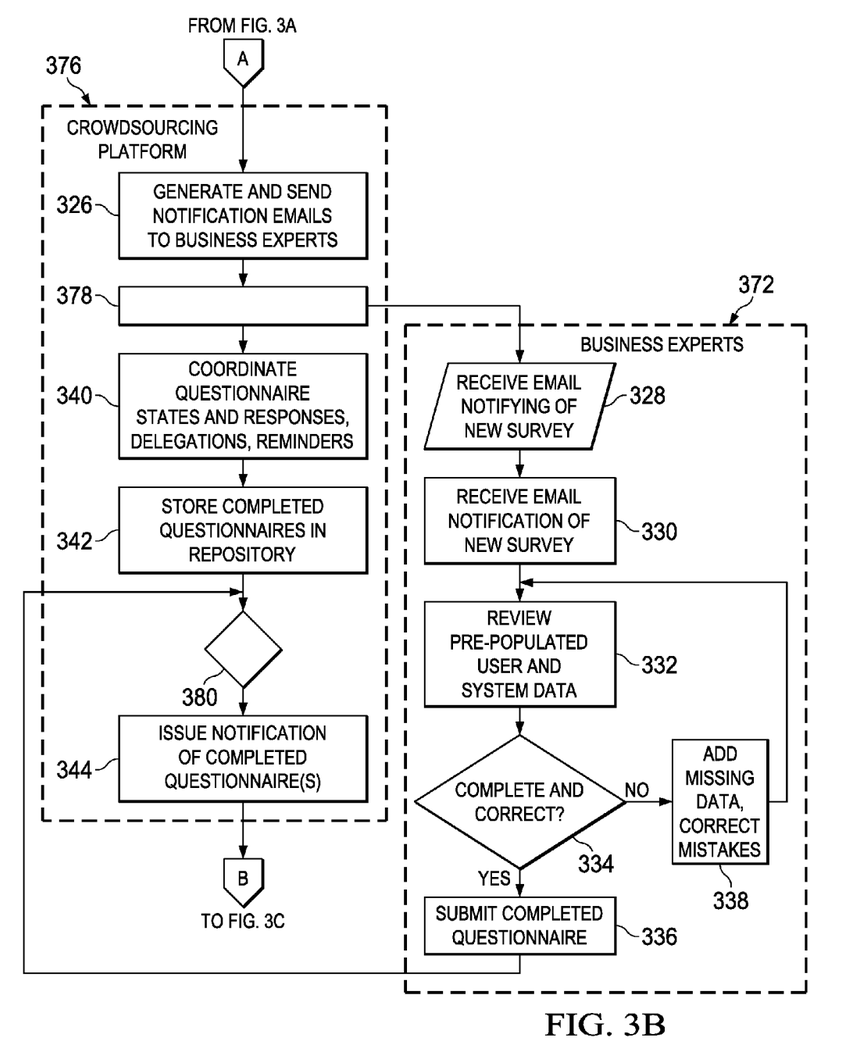
Figure 3C:
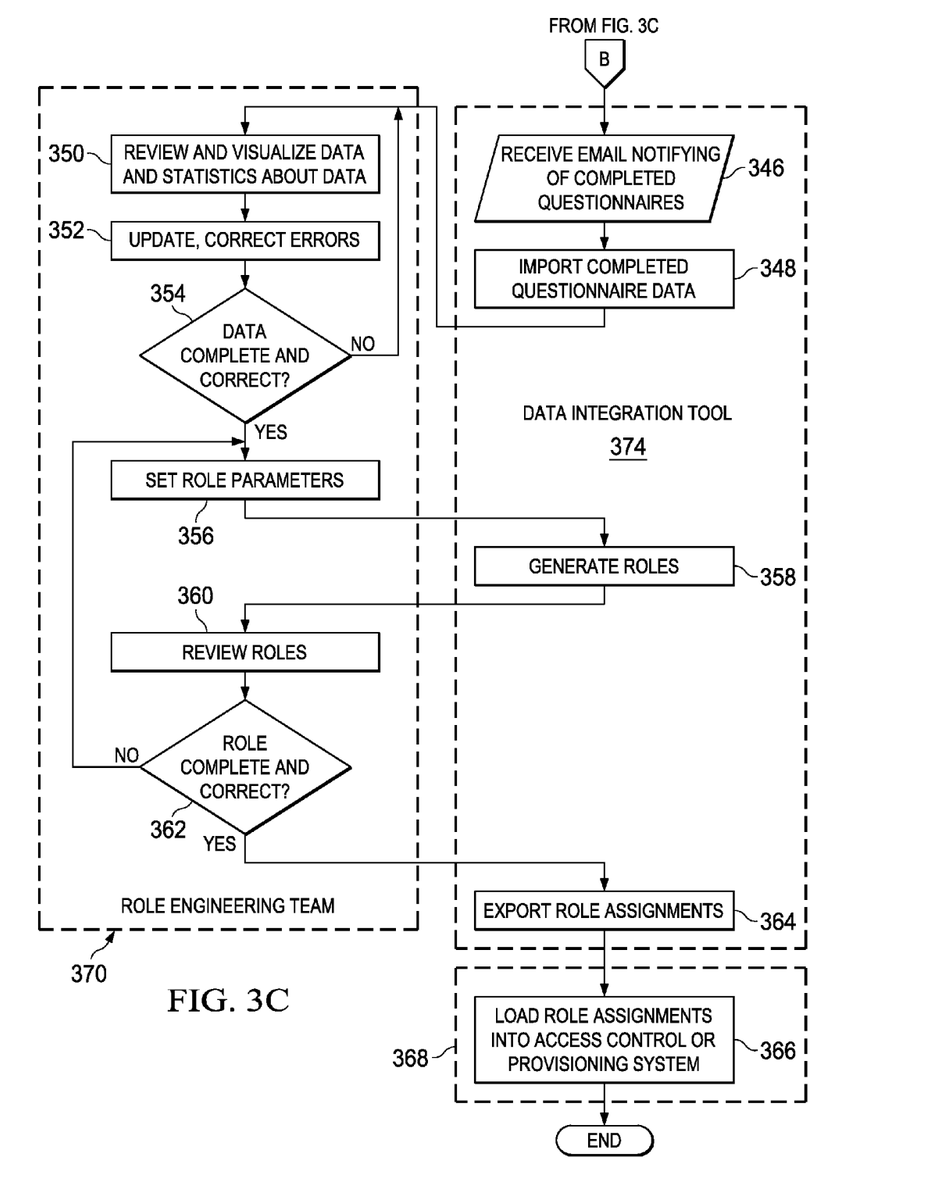

Referring to FIGS. 3A, 3B and 3C together, there is shown a flowchart depicting steps for a further embodiment of the invention. More specifically, FIGS. 3A, 3B and 3C show steps 302-324, steps 326-344, and steps 346-366, respectively. The embodiment comprises a more detailed procedure or method for constructing and using a questionnaire, such as that described above. The method of FIGS. 3A-3C also combines user and system data with data furnished by the questionnaire, to generate a set of roles for defining and controlling system access.

Moreover, respective steps of the method of FIGS. 3A-3C may be carried out by components of system 100, described above in connection with FIG. 1. To illustrate this, steps of the method are shown grouped with their respective implementing components. Thus, steps 302, 306-310 and 316-318 are grouped with and carried out by role engineering team 370. Steps 350-356 and 360-362 are also grouped with team 370. Role engineering team 370, for example, may include role engineer 120 of FIG. 1 interacting with the intelligent role proposal component 116.

FIGS. 3A-3C show steps 304 and 328-338 grouped with and carried out by business experts 372. These business expert experts usefully comprise the SMEs described in connection with FIG. 1. Steps 312-314, 320-324, 346-348, 358 and 364 are implemented by data integration tool 374. This may comprise data integration tool 102 of FIG. 1. Steps 326 and 340-344 are implemented by crowdsourcing platform 376, which may comprise crowdsourcing platform 114 of FIG. 1.

Referring further to FIGS. 3A-3C, there is shown the method thereof commencing at step 302, wherein the role engineering team 370 designs one or more questionnaire templates. The templates are then reviewed and corrected at step 304, by business experts 372, to provide to provide final questionnaire templates. At step 306 the role engineering team prepares the final questionnaires for deployment to the data integration tool.

At step 306 role engineering team 370 prepares the final questionnaire templates for deployment to the crowdsourcing platform.

At steps 308-310, a new project is created in the integration tool by role engineering team 370, and context and configuration settings are defined. At step 312 the integration tool 374 is operable to import data for the new project from multiple data sources that pertain to computer or data processing systems, to system users, and to their organization or enterprise. This data could be obtained, for example, from sources such as data sources 104-112 of FIG. 1.

At step 314 the data integration tool 374 executes rules for cleaning and mapping data fragments of the imported data onto a normalized model. The imported data is visualized and inspected by the role engineering team 370 at step 316. At decision step 318, the team 370 queries whether the imported data is sufficiently consistent for use in defining roles. If not, the method of FIGS. 3A-3C returns to step 310, and otherwise proceeds to step 320.

At step 320, upon determining that the data is sufficiently consistent for role definition, data integration tool 374 operates to pre-populate each questionnaire template with the cleaned user and system data. Tool 374 then uploads the populated questionnaire to crowdsourcing platform 376 at step 322, and automatically creates a new survey pertaining to the questionnaire at step 324. The method of FIGS. 3A-3C then proceeds to step 326.

Step 326 is implemented by crowdsourcing platform 376 to generate and send notification e-mails to SMEs or other business experts. Notice of a crowdsourcing task pertaining to the survey and questionnaires is thus provided to likely participants of the crowdsourcing task. The notification of step 326 encounter a fork 378, which directs them to both steps 328 and 340.

Business experts 372, such as SMEs as described above, receive e-mail notification of the survey from crowdsourcing platform 376 at steps 328 and 330. They also receive a questionnaire pertaining to the survey. At step 332 respective business experts participating in the crowdsourcing task complete the received questionnaire, and also review the user and system data provided by the multiple data sources, as described above. Decision step 334 determines whether the questionnaires have been correctly completed, and if so the method proceeds to step 336. Otherwise, the method proceeds to step 338. At step 338 missing data is added, mistakes are corrected, and the method is then moved back to step 332.

FIG. 3B shows that step 336 submits completed questionnaires from respective experts to a junction 380 located at crowdsourcing platform 376. FIGS. 3A-3C shows further that step 340, after receiving e-mail notifications from fork 378, coordinates questionnaire states, and responses, delegations and reminders. Crowdsourcing platform 376 is thus operable to support respective experts in completing the crowdsourcing task. Completed questionnaires are stored in a repository of the crowdsourcing platform at step 342, which is also connected to junction 380. Crowdsourcing platform 376 issues notification of completed questionnaires at step 344.

Referring further to FIG. 3C, there is shown data integration tool 374 receiving notification of the completed questionnaires at step 346. Tool 374 imports the completed questionnaire data at step 348. At step 350, the role engineering team reviews and visualizes this data and related statistics. Data updates and corrections are carried out at step 352, and decision step 354 determines whether or not the data is complete and correct. If not, the method returns to step 350, and otherwise proceeds to step 356.

The role engineering team sets role parameters at step 356, and the data input integration tool 374 generates roles at step 358. The roles are then reviewed by the role engineering team at step 360. At decision step 362, it is determined whether or not the roles are complete and correct. If not the method returns to step 356, and otherwise goes to step 364.

At step 364 the data integration tool exports respective role assignments to an identity and access component 368. This component carries out step 366, by loading role assignments into an access control provisioning system. In accordance with the provisioning policy, the provisioning system automatically grants system users access to the computer system to which they are respectively entitled.

Figure 4:
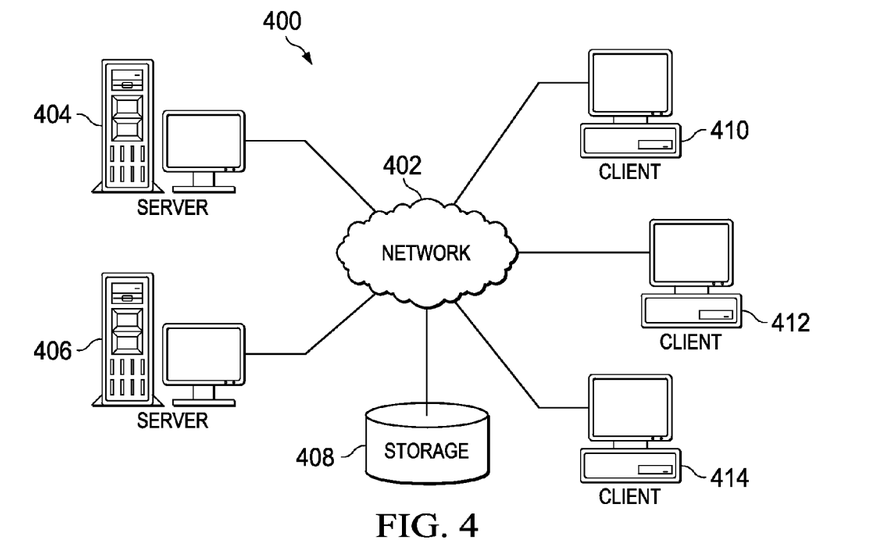
FIG. 4 is a block diagram showing a network of data processing systems in which an embodiment of the invention may be implemented.

FIG. 4 is a pictorial representation of a network of data processing systems in which illustrative embodiments of the invention may be implemented. Network data processing system 400 is a network of computers in which the illustrative embodiments may be implemented. Network data processing system 400 contains network 402, which is the medium used to provide communications links between various devices and computers connected together within network data processing system 400. Network 402 may include connections, such as wire, wireless communication links, or fiber optic cables.

In the depicted example, server computer 404 and server computer 406 connect to network 402 along with storage unit 408. In addition, client computers 410, 412, and 414 connect to network 402. Client computers 410, 412, and 414 may be, for example, personal computers or network computers. In the depicted example, server computer 404 provides information, such as boot files, operating system images, and applications to client computers 410, 412, and 414. Client computers 410, 412, and 414 are clients to server computer 404 in this example. Network data processing system 400 may include additional server computers, client computers, and other devices not shown.

Program code located in network data processing system 400 may be stored on a computer-recordable storage medium and downloaded to a data processing system or other device for use. For example, program code may be stored on a computer-recordable storage medium on server computer 404 and downloaded to client computer 410 over network 402 for use on client computer 410.

In the depicted example, network data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 400 also may be implemented as a number of different types of networks, such as, for example, an intranet, a local area network (LAN), or a wide area network (WAN). FIG. 4 is intended as an example, and not as an architectural limitation for the different illustrative embodiments.

Figure 5:
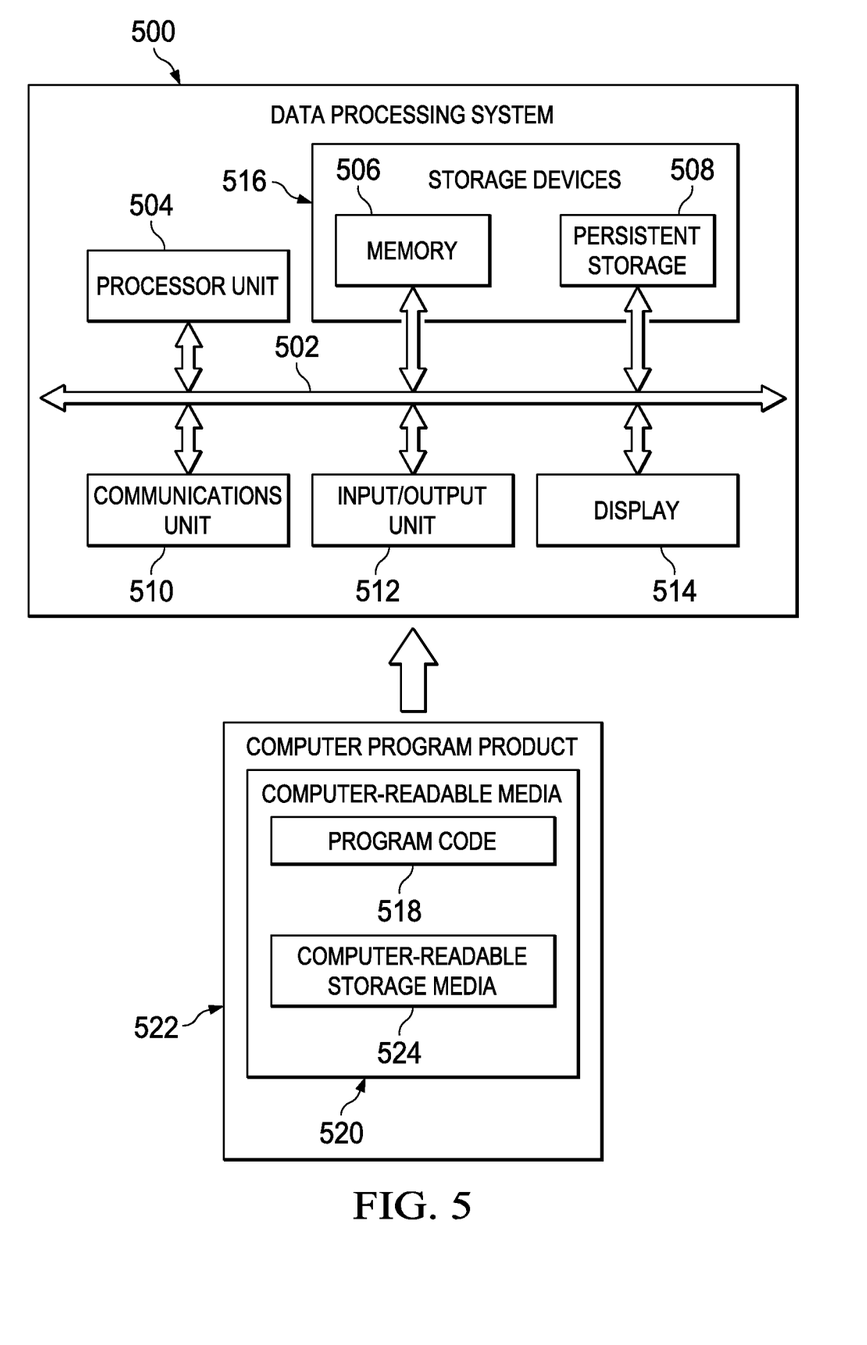
FIG. 5 is a block diagram showing a computer or data processing system that may be used in implementing embodiments of the invention.

Turning now to FIG. 5, an illustration of a data processing system is depicted in accordance with an illustrative embodiment. The data processing system may be used as one or more of the components for system 100. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer-readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer-usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these examples. In one example, computer-readable media 520 may be computer-readable storage media 524. Computer-readable storage media 524 may include, for example, an optical or magnetic disk that is inserted or placed into a drive or other device that is part of persistent storage 508 for transfer onto a storage device, such as a hard drive, that is part of persistent storage 508. Computer-readable storage media 524 also may take the form of a persistent storage, such as a hard drive, a thumb drive, or a flash memory, that is connected to data processing system 500. In some instances, computer-readable storage media 524 may not be removable from data processing system 500.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

As another example, a storage device in data processing system 500 is any hardware apparatus that may store data. Memory 506, persistent storage 508, and computer-readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In an environment wherein multiple users must each be able to access a particular computer system to perform respective functions, a computer program product executable in a non-transitory computer readable storage medium comprising:
   instructions for mining, by a computer device using a data integration tool, initial data from one or more data sources, wherein at least some of the mined initial data pertains to previously granted access rights for the particular computer system;
   instructions for executing, by the computer device using the data integration tool, rules to clean and map data fragments of the mined initial data onto a normalized model;
   instructions for generating, by the computer device using the data integration tool, a specified crowdsourcing task using the cleaned and mapped initial data;
   instructions for executing, by the computer device using the data integration tool, the specified crowdsourcing task to acquire crowdsourced data from subject matter experts (SMEs) in an SME population, wherein the crowdsourced data comprises additional data pertaining to the previously granted access rights for the particular computer system;
   instructions for resolving, by the computer device using the data integration tool, inconsistencies in the cleaned and mapped initial data and the crowdsourced data by removing duplicate Internet Protocol (IP) addresses, removing conflicts between two sets of roles with a same IP address and hostname, removing conflicts of same endpoints and different service names, removing conflicts of same endpoints and different host names with same IP addresses, removing conflicts of same endpoints and different IP addresses with same host names, removing conflicts of same endpoints with different platforms, and removing conflicts of same endpoints with different customers;
   instructions for generating, by the computer device using the data integration tool, a set of role definitions using the cleaned and mapped initial data and the crowdsourced data with resolved inconsistencies, wherein the generated set of role definitions determine which of the multiple users are assigned to be members of a particular role associated with the particular computer system, and further determine access rights for the particular computer system that are granted to each member of the particular role; and
   instructions for loading, by the computer device using an identity and access component, the generated set of role definitions into an access control system that controls user access to the particular computer system based on whether a user requesting access is a member of the particular role associated with the particular computer system as defined by the generated set of role definitions.

2. The computer program product of claim 1, wherein:
   the specified crowdsourcing task includes distributing a questionnaire to SMEs in the SME population, wherein the questionnaire is created to acquire the additional data from the SMEs pertaining to previously granted access rights for the particular computer system.

3. The computer program product of claim 2, wherein:
   the data integration tool is used in creating the questionnaire.

4. The computer program product of claim 2, wherein:
   the questionnaire is populated with at least some of the cleaned and mapped initial data.

5. The computer program product of claim 2, wherein:
   a crowdsourcing platform is used to distribute the questionnaire to respective SMEs.

6. The computer program product of claim 5, wherein:
   the crowdsourcing platform is provided with a mechanism for assisting completion of the questionnaire by respective SMEs.

7. The computer program product of claim 5, wherein:
   missing data is added and mistakes are corrected, selectively, to questionnaires that are distributed to respective SMEs.

8. The computer program product of claim 1, wherein:
   the mined initial data is acquired from multiple sources, and pertains to the particular computer system, to the multiple users of the particular computer system, and to an organization associated with the particular computer system, selectively.

9. The computer program product of claim 8, wherein:
   the multiple sources include a skill registry, a ticketing system and an enterprise directory, selectively.

10. In an environment wherein multiple users must each be able to access a particular computer system to perform respective functions, a computer system comprising:
    a bus;
    a memory connected to the bus, wherein program code is stored on the memory; and
    a processor unit connected to the bus, wherein the processor unit executes the program code to:
       mine, using a data integration tool, initial data from one or more data sources, wherein at least some of the mined initial data pertains to previously granted access rights for the particular computer system;
       execute, using the data integration tool, rules to clean and map data fragments of the mined initial data onto a normalized model;
       generate, using the data integration tool, a specified crowdsourcing task using the cleaned and mapped initial data;
       execute, using the data integration tool, the specified crowdsourcing task to acquire crowdsourced data from subject matter experts (SMEs) in an SME population, wherein the crowdsourced data comprises additional data pertaining to previously granted access rights for the particular computer system;

resolve, using the data integration tool, inconsistencies in the cleaned and mapped initial data and the crowdsourced data by removing duplicate Internet Protocol (IP) addresses, removing conflicts between two sets of roles with a same IP address and hostname, removing conflicts of same endpoints and different service names, removing conflicts of same endpoints and different host names with same IP addresses, removing conflicts of same endpoints and different IP addresses with same host names, removing conflicts of same endpoints with different platforms, and removing conflicts of same endpoints with different customers;

generate, using the data integration tool, a set of role definitions using the cleaned and mapped initial data and the crowdsourced data with resolved inconsistencies, wherein the generated set of role definitions determine which of the multiple users are assigned to be members of a particular role associated with the particular computer system, and further determine access rights for the particular computer system that are granted to each member of the particular role; and load, using an identity and access component, the generated set of role definitions into an access control system that controls user access to the particular computer system based on whether a user requesting access is a member of the particular role associated with the particular computer system as defined by the generated set of role definitions.

11. The computer system of claim 10, wherein:
the specified crowdsourcing task includes distributing a questionnaire to SMEs in the SME population, wherein the questionnaire is created to acquire the additional data from the SMEs pertaining to previously granted access rights for the particular computer system.

12. The computer system of claim 11, wherein:
the data integration tool is used in creating the questionnaire.

13. The computer system of claim 11, wherein:
the questionnaire is populated with at least some of the cleaned and mapped initial data.

14. The computer system of claim 11, wherein:
a crowdsourcing platform is used to distribute the questionnaire to respective SMEs.

15. The computer system of claim 14, wherein:
the crowdsourcing platform is provided with a mechanism for assisting completion of the questionnaire by respective SMEs.

16. The computer system of claim 10, wherein:
the mined initial data is acquired from multiple sources, and pertains to the particular computer system, to the multiple users of the particular computer system, and to an organization associated with the particular computer system, selectively.

* * * * *